United States Patent
Boss et al.

(10) Patent No.: US 9,733,697 B2
(45) Date of Patent: *Aug. 15, 2017

(54) MANAGING ACCESS TO DATA ON A CLIENT DEVICE DURING LOW-POWER STATE

(71) Applicant: International Business Machines Corporation, Armonk, NY (US)

(72) Inventors: Gregory J. Boss, Saginaw, MI (US); Guy Cohen, Mohegan Lake, NY (US); James R. Kozloski, New Fairfield, CT (US); Clifford A. Pickover, Yorktown Heights, NY (US); Anne R. Sand, Canon City, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,862

(22) Filed: Jun. 8, 2016

(65) Prior Publication Data
US 2016/0282933 A1 Sep. 29, 2016

Related U.S. Application Data

(63) Continuation of application No. 14/138,714, filed on Dec. 23, 2013, now Pat. No. 9,405,346.

(51) Int. Cl.
*G06F 1/32* (2006.01)
*H04L 29/08* (2006.01)
*H04W 52/02* (2009.01)

(52) U.S. Cl.
CPC .......... *G06F 1/3296* (2013.01); *G06F 1/3206* (2013.01); *G06F 1/3209* (2013.01);
(Continued)

(58) Field of Classification Search
None
See application file for complete search history.

(56) References Cited

U.S. PATENT DOCUMENTS 8,239,698 B2   8/2012  Maciocco et al.
8,271,814 B2   9/2012  Padmanabhan et al.
(Continued)

OTHER PUBLICATIONS

Bila, N., et al., "The case for energy-oriented partial desktop migration," Proceedings of the 2nd USENIX Conference on Hot Topics in Cloud Computing, 2010, 3-3, 7 pages.
(Continued)

*Primary Examiner* — Paul Yanchus, III
(74) *Attorney, Agent, or Firm* — Fleit Gibbons Gutman Bongini Bianco PL; Jon A. Gibbons

(57) ABSTRACT

Disclosed is a novel system and method for maintaining computing functionality when a client device must be used in a low-power state. More particularly, when a client device is placed in a low-power state, sleep mode, or even shutdown, this method transfers aspects of the machine state onto a virtual machine in the cloud. This virtual machine may then function as a partial or full emulator of the user's client machine and thus can be: 1) accessed; and 2) communicated with by the machine's owner or others who use the machine. As long as the client device is shutdown, the cloud continues to temporarily function as the user's machine. Numerous embodiments are disclosed including a "hybrid decomposition feature" in which the data on the client machine is prioritized and then transfer to a server, typically a virtual emulator, component by component or piecemeal manner or manner.

16 Claims, 6 Drawing Sheets

(52) U.S. Cl.
CPC ............ *G06F 1/3212* (2013.01); *H04L 67/08* (2013.01); *H04L 67/10* (2013.01); *H04L 67/145* (2013.01); *H04L 67/2861* (2013.01); *H04L 67/322* (2013.01); *H04L 67/325* (2013.01); *H04W 52/02* (2013.01); *H04W 52/0277* (2013.01); *Y02B 60/1292* (2013.01); *Y02B 60/50* (2013.01)

(56) References Cited

U.S. PATENT DOCUMENTS

| | | | |
|---|---|---|---|
| 8,290,906 | B1 | 10/2012 | Kushmerick |
| 8,307,234 | B2 | 11/2012 | Gobriel et al. |
| 9,405,346 | B2 * | 8/2016 | Boss ................. H04W 52/0277 |
| 2008/0104587 | A1 | 5/2008 | Magenheimer ....... G06F 1/3203 718/1 |
| 2010/0174808 | A1 | 7/2010 | Dabagh et al. |
| 2010/0332212 | A1 | 12/2010 | Finkelman ............ G06F 1/3203 703/23 |
| 2011/0191610 | A1 | 8/2011 | Agarwal et al. |
| 2012/0102084 | A1 | 4/2012 | Hiltunen et al. |
| 2012/0250858 | A1 | 10/2012 | Iqbal et al. |

OTHER PUBLICATIONS

Bila, N., et al., "Jettison: efficient idle desktop consolidation with partial VM migration," Proceedings of the 7th ACM European Conference on Computer Systems, Apr. 2012, pp. 211-224. Copyright 2012 ACM 978-1-4503-1223-3/12/04, http://doi.acm.org/10.1145/2168836.2168858.

Nedevschi, S., et al., "Skilled in the art of being idle: reducing energy waste in networked systems," Proceedings of the 6th USENIX Symposium on Networked Systems Design and Implementation, Apr. 2009, pp. 381-394.

Agarwal, Y., et al., "Somniloquy: augmenting network Interfaces to reduce PC energy usage," Proceedings of the 6th USENIX Symposium on Networked Systems Design and Implementation, Apr. 2009, pp. 365-380.

Agarwal, Y., et al., "Sleepserver. A software-only approach for reducing the energy consumption of pcs within enterprise environments," Proceedings of the 2010 USENIX Annual Technical Conference, Jun. 2010, pp. 1-15.

* cited by examiner

| USER | LOCAL DATA (I.E. APPLICATION, APPLICATION STATE, FILE) | LOCAL REMAINING POWER REQUIRED | BANDWIDTH AVAILABLE | RELATIVE IMPORTANCE | LAST ACCESSED | TOPIC EXTRACTION | ... |
|---|---|---|---|---|---|---|---|
| USER 1 | APPLICATION 1 | 38% | 4G | 3 | 15:34 | N/A | ... |
| USER 1 | APPLICATION 2 AND STATE 2 | 23% | 4G | 1 | 16:01 | N/A | ... |
| USER 1 | FILE 1 | 67% | 4G | 2 | 16:12 | RESEARCH | ... |
| USER 2 | FILE 2 | 4% | 4G | 4 | 14:48 | PAPER | ... |
| USER 1 | APPLICATION 3, STATE 3, AND FILE 3 | 40% | 4G | 10 | 11:51 | N/A | ... |
| USER 2 | APPLICATION 4 AND FILE 4 | 77% | 4G | 7 | 12:56 | GROCERY LIST | ... |
| ... | ... | ... | ... | ... | ... | ... | ... |

FIG. 2

MANAGING ACCESS TO DATA ON A CLIENT DEVICE DURING LOW-POWER STATE

BACKGROUND

The present invention generally relates to providing remote access to data including applications, files, and application states stored on a client device, and more specifically to providing remote access to data when the client device is entering a low power state.

The popularity of client and portable devices continues to grow. Consumers are purchasing larger numbers of client devices, such as, smartphones, tablets, laptops and desktop computers. The growth in client devices along with increased connectivity has allowed users to collaborate more and more. Often times user of client devices have data stored locally, such as files, applications, and application states. When the client device is entering a low power state either because of user initiation, such as closing a lid on a laptop, or because the remaining battery life is so low, the data stored on the local device becomes unavailable to remote users. This can be a problem when several users are collaborating on an item stored on the client device. It is also a problem when users work with multiple devices.

SUMMARY

Disclosed is a method and system for maintaining computing functionality when a client device is placed in a low-power state, sleep mode, or even powered-off. Data on the client device such as an application, a file, and, a machine state is transferred over to a virtual machine on a server in the cloud. This virtual machine may then function as a partial or full emulator of the user's client machine and thus can be: 1) accessed; and 2) communicated with by the client device's owner or by others.

As long as the client device is shutdown, the cloud continues to temporarily function as the user's machine. When the client device is resumed from a sleep or standby power state to an operational power state, the client device may download the current state and application data, and even the application, from the cloud and then continue normal operation in a seamless fashion.

The claimed invention provides a "hybrid decomposition feature" in which the data on the client machine is prioritized and then transferred to a virtual machine on a server. The server is typically a virtual emulator, component by component or piecemeal manner or manner. This optimally makes use of available power and bandwidth to ensure functionality of the hybrid is maximized.

In order to determine when and how much information and functionality to transfer, a determination is made of: 1) current or forecast relative "importance" of tasks; 2) current or forecast network bandwidth; 3) current or forecast CPU and memory utilization; and 4) current or forecast required power. Keep-alive messages are received from other client devices. The keep-alive messages indicate others want to maintain access to local data on the client device going into a low power state. For example, collaborators, or instant-message partners, etc., may decide that they find it important to keep-alive a state of a client device and signal this intent to the client device.

In one example the management of a low power state on a client device begins with processing at least a first set of local data in a plurality of sets of local data on a first client device. The processing of data can be execution of a program or application and the state of the program.

A message is received from at least a second client device. The message can be machine readable message such as keep-alive message or heart-beat message, or human readable message, such as text and email. The message is used to indicate that a second device wants to maintain access to the first set of local data on the first client device. Next, a request is received for the first client device to enter a low power state. This request in response to a user action on the first client device such as hitting a "sleep" button or closing the lid on a laptop. In another example, the request can be from a power management system on a portable device reaching a low battery state.

A local power requirement is calculated on the first client device in order to copy the first set of local data to a server computer. The first local data is copied to the server computer in order to continue to provide access to the first set of local data. In response to receiving a message to maintain access by a second client device and combined with the power requirement being is sufficient, the first set of data is copied to the server computer. This allows the first client device enters a low power state while the second client device can continue to access the first set of local data from the server.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 is a table of values stored locally at a client device when prioritizing what data is to be sent to the cloud to enable continue access by other client devices;

DETAILED DESCRIPTION

Figure 1:
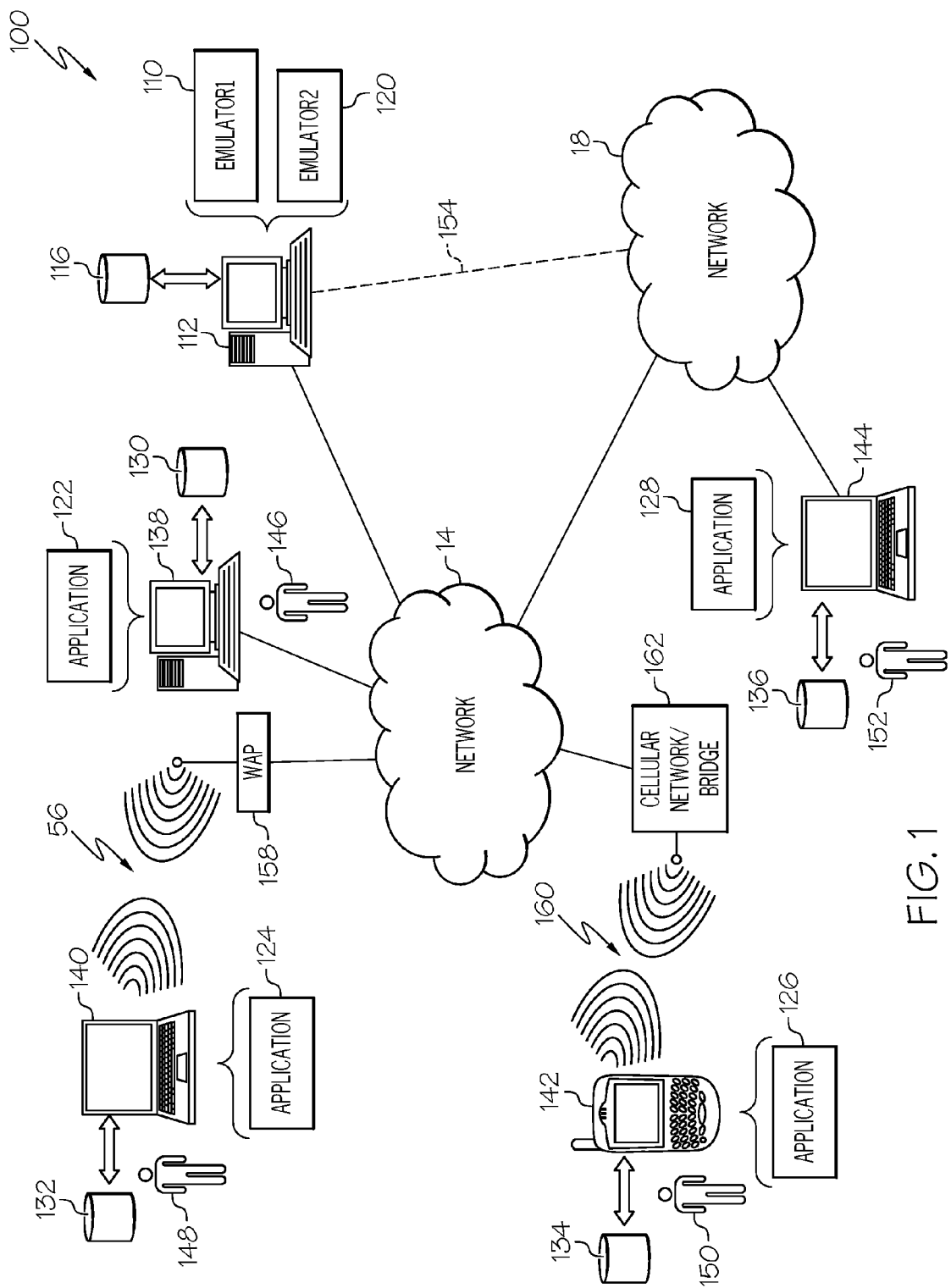
FIG. 1 diagrammatically depicts a local applications running on various client devices coupled to a distributed computing network.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Non-Limiting Definitions

The terminology used herein is for the purpose of describing particular embodiments only and is not intended to be limiting of the invention. As used herein, the singular forms "a", "an" and "the" are intended to include the plural forms as well, unless the context clearly indicates otherwise.

The term "application state" refers to information, such as variables and contents of memory in the client device that are captured at a given instant in time to enable an application to return to a previous state. The application state along with the application and data is transferred to another machine. For example, if a user is editing a word-processing document on a client device, the user may not only want the word-processing file copied to a server, but also the user may want information copied on the state of the application i.e., where is the user scrolled to in a document so that editing from the exact spot can be continued when the document is transferred to the server.

The term "client device" is any device, such as a computer, laptop, smartphone, tablet, television, or other information processing device in which software and data can be processed.

The terms "comprises" and/or "comprising," specify the presence of stated features, steps, operations, elements, and/or components, but do not preclude the presence or addition of one or more other features, integers, steps, operations, elements, components, and/or groups thereof.

The term "emulator" is a program along with underlying hardware that substantially duplicates the functions of a client device processing data on a server or host machine. The goal in emulators is to have the host machine simulate the behavior when processing data of the client system.

The term "local data" is a set of values that are typically represented in structures, known as data structures or files stored at a client device. The local data stored includes files, applications, states of applications, or a combination thereof.

The term "local power requirement" is an estimate of an amount of battery power or local power source needed to complete a task on the client device, such as copying data to a server computer.

The term "message" means communication passed from one client computer to another client computer, whether machine readable message such as a keep alive message or a heartbeat message, a human readable such as a text message and an email.

The term "relative importance value" means a value associated a specific set of local data used to prioritize which set of local data is copied to a server computer first. This is especially important when the client device is in critical battery state, with not enough time remaining for copying all the different sets of data.

The term "topic extraction" means using tools and algorithms to extract topics from text documents. Topic extraction is used to set the relative importance value of a set of local data. For example, a topic such as "important sales document" would take precedence over "grocery shopping list.

The term "user profile" means a customizable configuration value used to set the relative importance value of a set of local data. For example, one user may deem word-processing tasks have higher priority than SMS tasks. Another user may deem an application executing is more important than an email.

Distributed Computer System

Referring to FIG. 1, there is a distributed computer system 100 that may be used to carry out the management of data. A server computer 112 is connected to network 114, e.g., the Internet or a local area network. Examples of server computer 112 may include, but are not limited to: a personal computer, a server computer, a series of server computers, a mini computer, and a mainframe computer. Server computer 112 is capable of running emulators to emulate different operating environment on different client devices 138, 140, 142, 144. The operating environments on the client devices may be Microsoft Windows, Apple iOS, Google Android, Linux, or other operating systems. The server 112 may be a single server or a series of servers running a network operating system, examples of which may include but are not limited to Microsoft Windows Server or Linux.

The instruction sets and subroutines of the process to manage messages between client devices 138, 140, 142, 144 may come through the server 112 or via a separate network. Storage device 116 may include but is not limited to: a hard disk drive; a tape drive; an optical drive; a RAID array; a random access memory (RAM); and a read-only memory (ROM). Users 146, 148, 150, 152 may access messages 120 directly through network 114 or through secondary network 118. Further, server computer 112 (i.e., the computer that executes email server application 120) may be connected to network 114 through secondary network 118, as illustrated with phantom link line 154.

Server computer 112 may execute a web server application, examples of which may include but are not limited to IBM Websphere or Apache Webserver™, that allows for HTTP (i.e., HyperText Transfer Protocol) access to server computer 112 via network 114. Network 114 may be connected to one or more secondary networks e.g., network 118, examples of which may include but are not limited to: a local area network; a wide area network; or an intranet, for example.

Server computer 112 may execute a hypervisor or virtual machine monitor application (VMMA) 120, examples of which may include but are not limited to Citrix XenApp, Citrix XenDesktop, Remote Desktop Services, VMware View, and others. VMMA 120 may provide full desktop virtualization or partial desktop virtualization to one or more client applications 122, 124, 126, 128. The computer code for the emulators 110 and 120 may be a standalone application or an applet/application that is executed within a server application.

The instruction sets and subroutines of server emulators 110, 120, which may be stored on storage device 116 coupled to server computer 112 may be executed by one or more processors (not shown) and one or more memory architectures (not shown) incorporated into server computer 112.

In addition/as an alternative to being a server-based emulators 110, 120 residing on server computer 112, the emulators may be a client-side application residing on one or more client devices 138, 140, 142, 144, e.g., stored on storage devices 130, 132, 134, 136, respectively and then uploaded to the server 112. Moreover, the messages received at client devices 138, 140, 142, 144 as a client-side application may, e.g., be a standalone application, interface with an email client application, or may be an applet/application that is executed within email client application or messaging application. Accordingly, message propagation process may be a server-based process, a client-side process and/or may be a hybrid client-side/server-based process, which may be executed, in whole or in part, by client application and by email server application.

The instruction sets and subroutines of applications 122, 124, 126, 128, which may be stored on storage devices 130, 132, 134, 136 (respectively) coupled to client devices 138, 140, 142, 144 (respectively), may be executed by one or more processors (not shown) and one or more memory architectures (not shown) incorporated into client devices 138, 140, 142, 144 (respectively). Storage devices 130, 132, 134, 136 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of client devices 138, 140, 142, 144 may include, but are not limited to, personal computer 138, laptop computer 140, cellular telephone 142, notebook or table computer 144, and a dedicated network device (not shown).

Users 146, 148, 150, 152 may place client devices 138, 140, 142, 144 in a low power state by selecting a dedicated button. In another example, the client device is placed in a low power state by receiving a notification from a local inactivity timer or battery power monitor. The client devices 138, 140, 142, 144 when placed in a low power state may send a message to server 112.

The various client devices may be directly or indirectly coupled to network 114 (or network 118). For example, personal computer 138 is shown directly coupled to network 114 via a hardwired network connection. Further, notebook computer 144 is shown directly coupled to network 118 via a hardwired network connection. Laptop computer 140 is shown wirelessly coupled to network 114 via wireless communication channel 156 established between laptop computer 140 and wireless access point (i.e., WAP) 158, which is shown directly coupled to network 114. WAP 158 may be, for example, an IEEE 802.11a, 802.11b, 802.11g, Wi-Fi, and/or Bluetooth device that is capable of establishing wireless communication channel 156 between laptop computer 140 and WAP 158. Personal digital assistant 142 is shown wirelessly coupled to network 114 via wireless communication channel 160 established between personal digital assistant 142 and cellular network/bridge 162, which is shown directly coupled to network 114.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client devices 138, 140, 142, 144 may each execute an operating system, examples of which may include but are not limited to Microsoft Windows, Apple iOS, Google Android, Linux, BlackBerry OS or a custom operating system.

Table for Prioritizing Data to be Uploaded to Cloud

FIG. 2 is a table 200 of values stored locally at a client device when prioritizing what data is to be sent to the cloud to enable continue access by other client devices. Beginning with a first column 202, various users (user 1, user 2, . . . ) may be logged in on a same client device, such as a laptop. A type of data 204 is indicated. The data can be an application, an application state, a file, such as data for an application. Column 206 is the local remaining power required to upload a given type of data 204 for a user 202. Additionally, a power-level "P" may be determined. The term "power-level" is used broadly in this context. For example, "P" may depend on actual or forecast battery charge. It may also be based on a real-time trigger by the user of an intention of desiring to enter a sleep state, a hibernate state, a suspend state, or a shut-down state.

Note that the percentages can vary widely based on factors that include the size of the data and the bandwidth available 208. For example, if the network is currently very speedy and reliable, more of the user's state may be transmitted, on-the-fly, to the cloud. However, if the network is currently slow or unreliable, or is forecast to be slow or unreliable within time period "T", then less of the user's state may be transferred. The system may also consider the requirement of resources "C," like CPU and memory, so that if prior to entering a suspended state a process (which is determined to take significant amounts of CPU) may be transferred.

An importance factor 210 is shown. This importance factor "I" can be set based on the number of messages received by other client devices and a historical data, such as how often this data is uploaded to the cloud for a particular user. A last accessed time in column 212 is shown. Data sets that are accessed more recently may indicate higher importance. A topic extraction 214 for local data may be shown. The topic is meta data used to describe the data. Keyword searching may be used to determine the difference between topics. One example of a topic extraction tool is IBM® SPSS® Text Analytics for Surveys. This tool extracts key concepts from files. Other terminology mining or extraction tools may also be used. A combination of the values in a given row 220, 222, 224, 226, 228 is used to prioritize or "triage" which of the data is to be sent first, and if the remaining power permits second, then third, etc. The importance "I" may be computed both for user applications (e.g. Web browser state, word-processing state, email state, instant-message state, etc.) as well as for certain lower-level states, such as operating-system states.

In one example, a function "F" is computed based on importance of tasks, applications, subtasks, etc., along with an assessment of current bandwidth, forecast bandwidth, current CPU and memory needs, future CPU and memory needs, current power level, forecast power level—along with the Keep-Alive signals "K" from others.

Based on the value of "F", the amount and nature of information transfer is controlled. For example, if the bandwidth is high and a user is engaged in a word-processing task, the word-processing tasks may be transferred and remain "open" and "active" on the cloud.

For each of the set(s) of data being processed on the first client device:
  i. Determine required bandwidth to storage for computation to proceed (BWS);
  ii. Determine required bandwidth to the user interface i.e. to memory for display and input devices to proceed (BWUI);
  iii. Determine required power to compute on local device (PCL);
  iv. Determine required power to maintain storage on local device (PSL);

Apply the following logic:
  if (BWUI>BWC), maintain task on local system; there is no way to maintain appropriate UI given bandwidth to cloud (BWC) else if (BWS>BWC).
  if (BWUI==0), upload task function to cloud, including memory state and required store, the process is running in the background and local store is not maintainable>else
  if (BWUI<BWC), add to list of possible task uploads to cloud (PTUs), including memory state and required store, else if (BWS<BWC), add to list of PTUs, including memory state, and possibly, but not necessarily, required store.

Determine PTUs to upload to the cloud, and whether to upload their required stores:
  i. Rank PTUs by power for computation (highest to lowest)
  ii. Loop over list, applying the following logic until BWC is exhausted:
    if (PTU not yet migrated), allocate BWC to its BWUI, migrate task computation to cloud if (BWC>0)>if (BWS>BWC) OR the power savings of migrating task's computation but not store to cloud exceeds the power savings of migrating the next PTU on the list, then allocate BWC to its BWS and migrate required store to cloud After determining PTUs to upload, if RLP is less than power to compute local task and provide for local stores.
  i. shut down local system.
  ii. terminate tasks on cloud that depend on local stores.

Full Machine State Transfer to the Cloud

In one example, a full machine state transfer to the cloud is performed. In this example, a first client device is suspended. Transfer set(s) of data to host server, meaning the contents of both the RAM and Storage. In one embodiment, this may transfer to the host server as two files: a copy of active RAM and a vmdk or ovf. From this point, the cloud has complete access independent of the suspended first client device.

In another example, a partial machine state transfer to the cloud is performed. In this example, the first client device is suspended. Transfer machine state to the cloud, but only transfer the contents of RAM. Leave the Storage in place on the first client device, but make a remote connection to the storage device from the cloud. The host server now has a diskless VM running with the machines (i.e. laptop) system state and the storage is mapped back to the host server.

From this point, all changes a user makes to the cloud virtual machine system actually get written in real-time to the laptops storage drive. Only enough power would need to be maintained to write and read elements from the storage drive.

This has the advantages of near instantaneous transfer of control from the cloud back to the laptop (transfer of session state can be continuous). Little network bandwidth is required and the initial transfer of session state would be much faster.

Process Flow for Managing Access to Data

Figure 3:
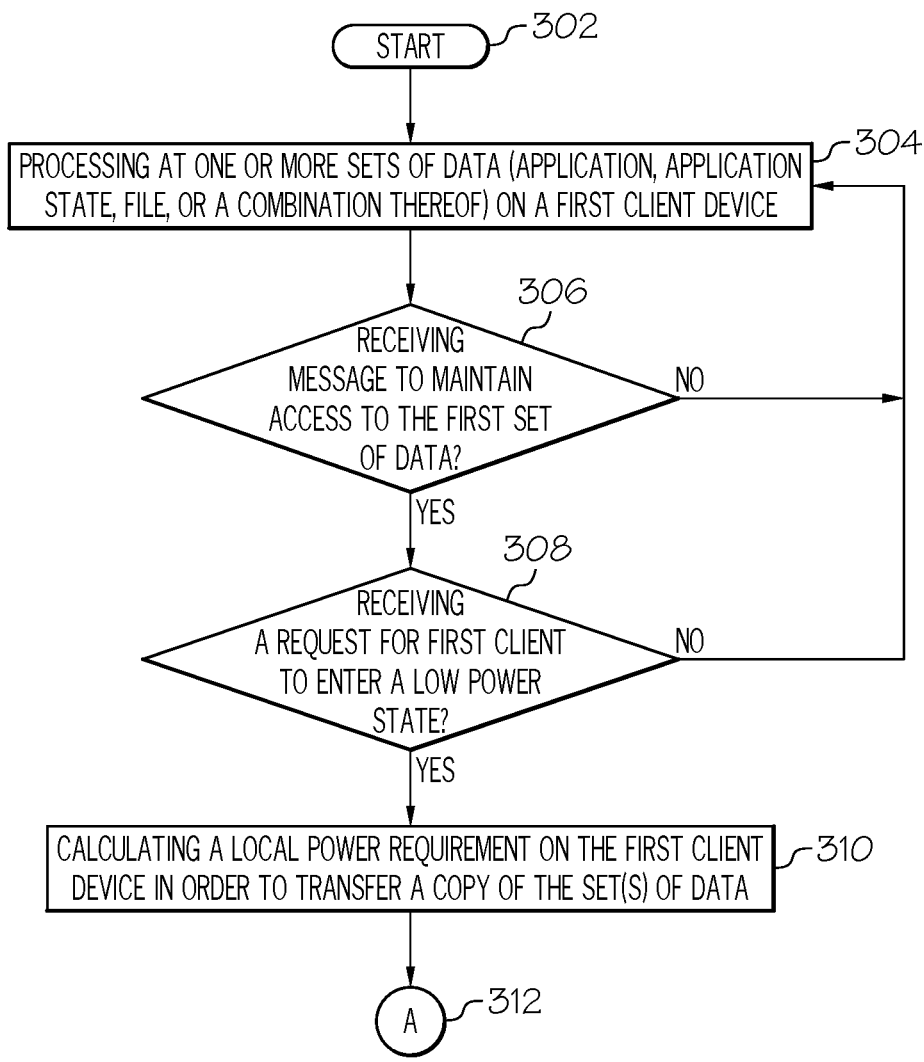
FIG. 3 and FIG. 4 is a flow chart of managing access to data on a client device during a low power state.
Figure 4:
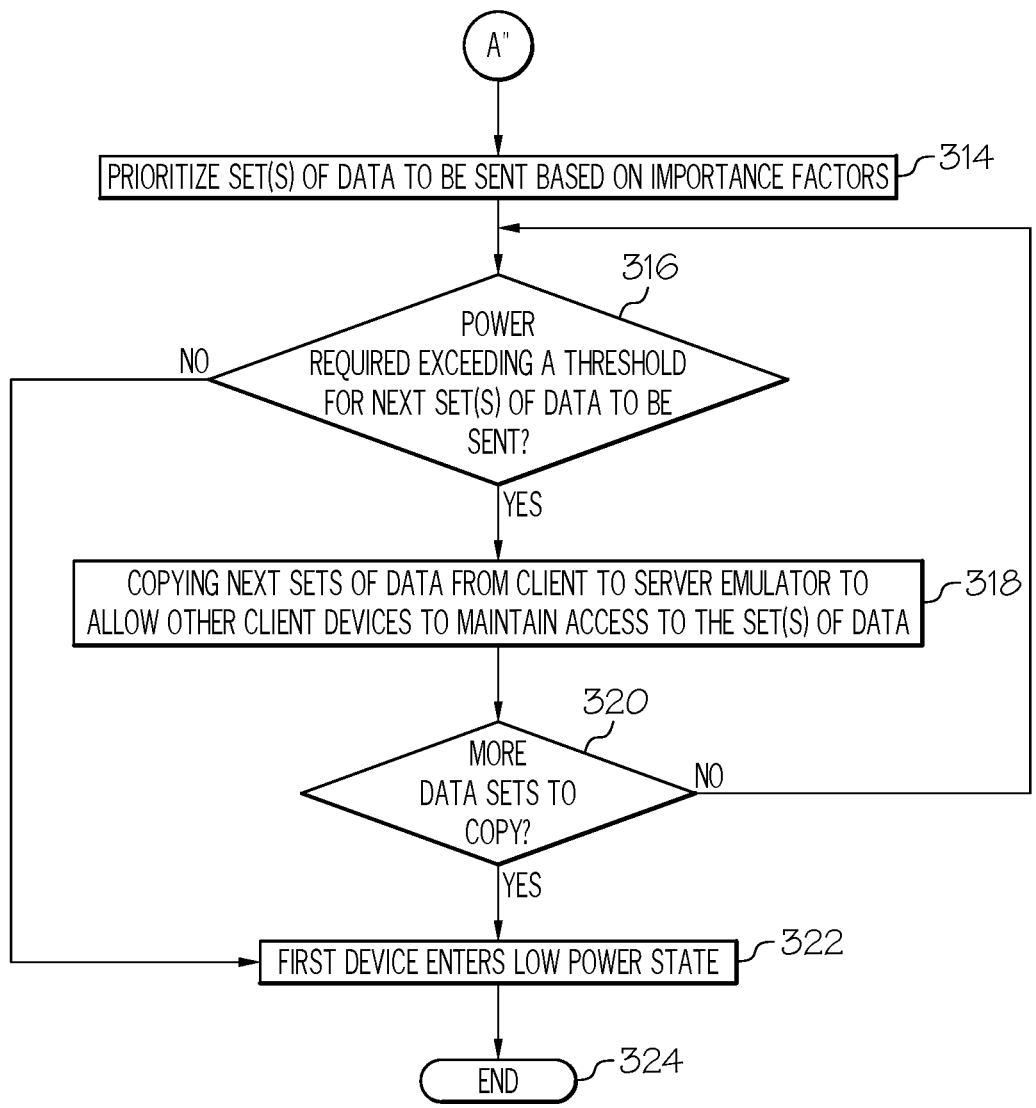

FIG. 3 and FIG. 4 is a flow chart 300 of managing access to data on a client device during a low power state. The process begins in step 302 and immediately proceeds to step 304 in which one or more sets of data are being processed by a first client device. A test is made in step 306 to see if a message is received from a second client device to maintain access to sets of data on the first client device. For example, collaborators, or instant-message partners, etc., may decide that they find it important to keep-alive a remote client state and signal this intent). In one embodiment, both the user and collaborators may receive notification that the client platform is transitioning to the low-power state. When a request is received the process continues to step 308. Otherwise, the process loops back to step 304.

In step 308 a second test is entered to determine if a request or indication for the first client to enter a low power state. For example, the user is placing first client device in sleep mode. Using the table 200 in FIG. 2 local power requirement on the first client device is estimated in step 310 to transfer each of the requested local sets of data from the first client device to the server.

In step 314, the relative importance of each set of data is assigned using the factors such as those shown in Table 200 of FIG. 2. Based on a combination of one or more factors in Table 200 of FIG. 2 the priority is assigned. Continuing, in the priority order, to the next set of data in step 316, a determination is made to ensure the remaining power exceeds a threshold in Table 200. This prevents partial transfers of sets of data from the first client device to the server. In the event the remaining power is below the threshold, the process continues to step 322. Otherwise the process continues to step 318.

In step 318, the next set of data in the priority assigned is sent from the first client device to the server. A test in step 320 is made to determine if any more set(s) of data are to be transferred according to the priority order previously assigned and the process loops back to step 316. Otherwise, the first device enters a low power state and the process ends in step 324.

In some examples, the user's state may be periodically transferred (or "mirrored") so that when it is necessary or useful to enter a low-power state, only a small incremental amount of state needs to be transferred.

In another example, a payload may be received by the server from the client platform. The payload being configured to maintain connectivity with a remote resource while the client platform is in the low-power state, transmitting a packet including the payload and receiving a packet including an acknowledgement. The general keep-alive messages and a list of security tokens may then be transferred to the NIC (Network Interface Circuitry) before the client platform transitions in the low-power state. Additionally, information about each keep-alive message (such as the minimum required periodicity to maintain presence/connectivity, the destination address for the keep-alive message, etc.) may also be transferred to the NIC.

Process Flow for Restoring Data to Client

Figure 5:
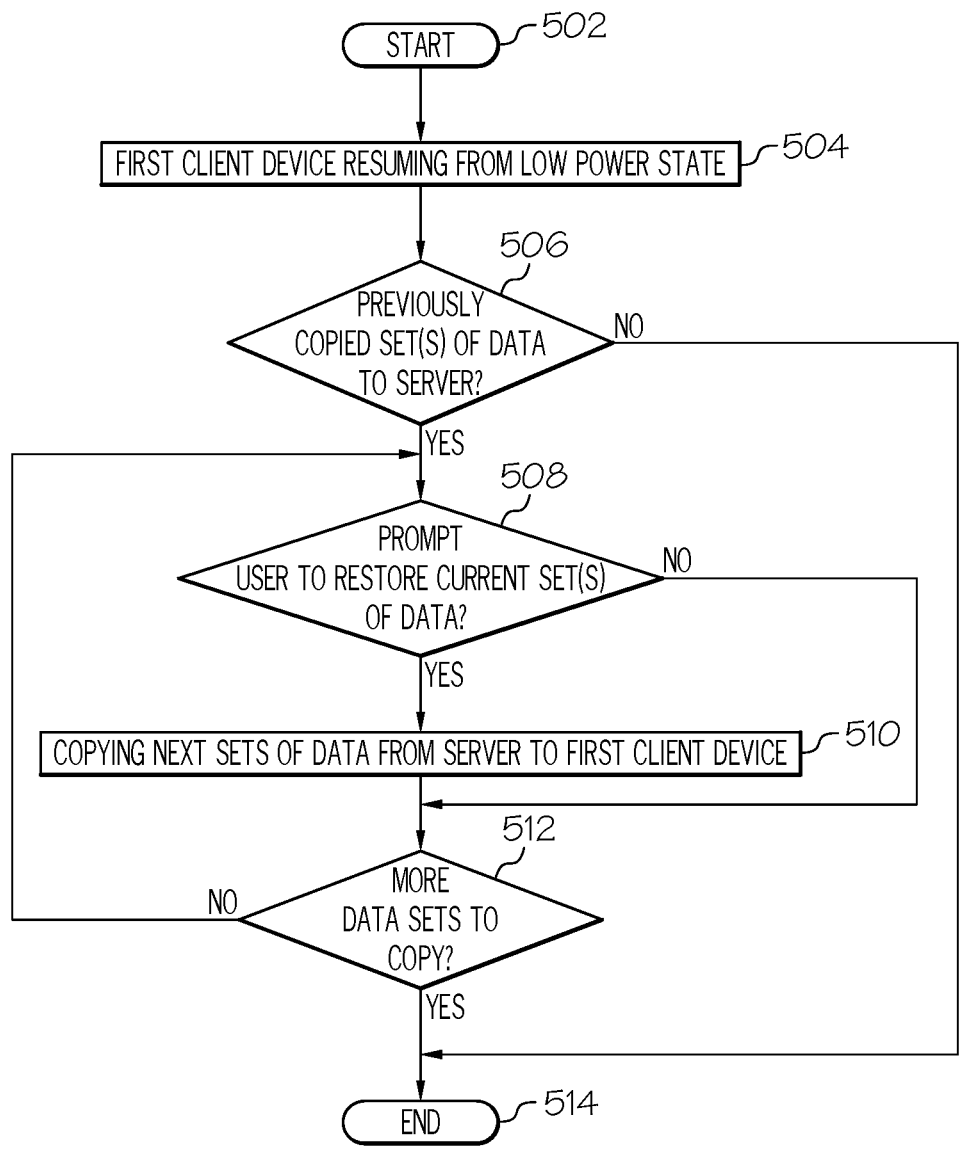
FIG. 5 is a flow chart of restoring data from a server in the cloud to a client device after resuming from a low power state.

FIG. 5 is a flow chart 500 of restoring data from a server to a client device after the client resumes from a low power state is a flow chart 300 of managing access to data on a client device during a low power state. The process begins in step 502 and immediately proceeds to step 504 in which the first client device resumes from a low power state. This change from a low power state to an operating state may any of resuming, turning-on, restoring, or rebooting the client device. Next a test is made to determine if there are previously copied one or more sets of data to a server. This test in one example is a flag that is set in the flow chart in FIG. 3. If no previously data from the first client device was copied the process ends in step 514. Otherwise, in response to one of the sets of data were previous copied, another test is made in step 508 in which the user is prompted for each of the sets of data to be restored. In response to receiving user input to restore current sets of data from the server, the process continues in step 510 in which a copy of set(s) of data are copied from server to first client device. A test is made in step 512 to determine if any more set(s) of data need to be copied. The process loops back to step 508 if other sets of data are to be processed. Otherwise, the process ends in step 514.

Information Processing System

Figure 6:
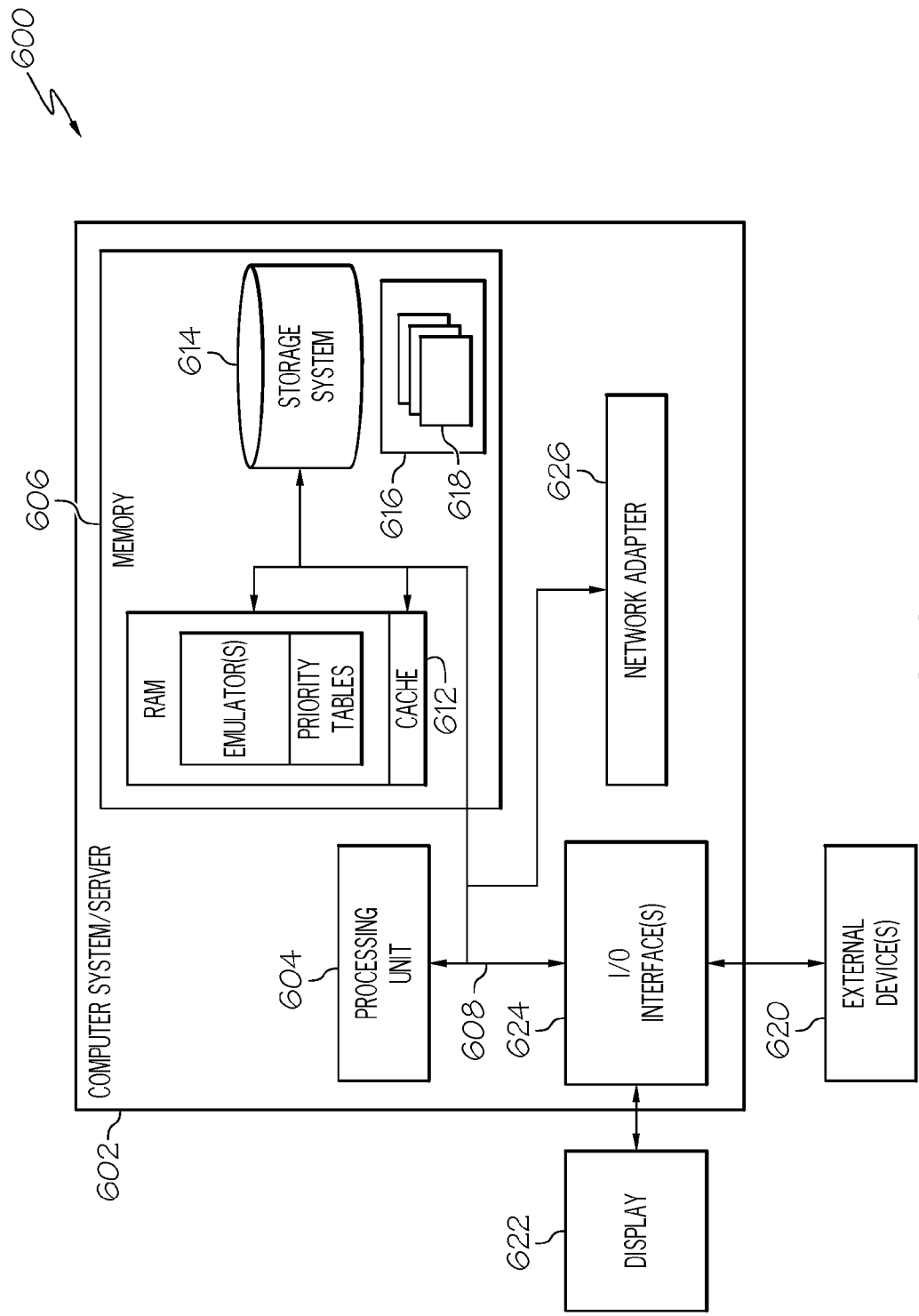
FIG. 6 is a block diagram illustrating one example of a client or server information processing system.

Referring now to FIG. 6, this figure is a block diagram illustrating an information processing system that can be utilized in embodiments of the present invention. The information processing system 602 is based upon a suitably configured processing system configured to implement one or more embodiments of the presently claimed invention. Any suitably configured processing system can be used as the information processing system 602 in embodiments of the present invention. The components of the information processing system 602 can include, but are not limited to, one or more processors or processing units 604, a system memory 606, and a bus 608 that couples various system components including the system memory 606 to the processor 604.

The bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 6, the main memory 606 includes the emulator 644 and priority table/prioritization factor 646. The system memory 606 can also include computer system readable media in the form of volatile memory, such as random access memory (RAM) 610 and/or cache memory 612. RAM 610 includes emulator(s) 110 and sorting factor 200, such as those shown in FIG. 2.

The information processing system 602 can further include other removable/non-removable, volatile/non-volatile computer system storage media. By way of example only, a storage system 614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 608 by one or more data media interfaces. The memory 406 can include at least one program product having a set of program modules that are configured to carry out the functions of an embodiment of the present invention.

Program/utility 616, having a set of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of embodiments of the present invention.

The information processing system 602 can also communicate with one or more external devices 620 such as a keyboard, a pointing device, a display 622, etc.; one or more devices that enable a user to interact with the information processing system 602; and/or any devices (e.g., network card, modem, etc.) that enable computer system/server 602 to communicate with one or more other computing devices. Such communication can occur via I/O interfaces 624. Still yet, the information processing system 602 can communicate with one or more networks such as a local area network (LAN), a general wide area network (WAN), and/or a public network (e.g., the Internet) via network adapter 626. As depicted, the network adapter 626 communicates with the other components of information processing system 602 via the bus 608. Other hardware and/or software components can also be used in conjunction with the information processing system 602. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A client device comprising:
    a memory;
    a processor communicatively coupled to the memory, where the processor is configured to perform
    prioritizing, based on importance factors, a plurality of sets of local data on a client device, the importance factors includes for each of the plurality of sets of local data a size of the local data, and
    receiving a request for the client device to enter a low power state and
    a) selecting a next set of local data of the plurality of sets of local data with a highest priority,
    b) calculating a local power requirement on the client device in order to transfer a copy of the next set of local data to a server computer in order to continue to provide access to the next set of local data, wherein the calculating the local power requirement includes calculating on the local power requirement to separately transfer a copy of at least one of the next set of local data,
    c) based on the local power requirement exceeding a required threshold, copying the next set of local data to the server computer; and
    d) determining if additional sets of local data in the plurality of sets of local data and required to be transferred, and in response to additional sets of local data being required, repeating steps a, b, c, and d with a next set of local data of the plurality of sets of local data with a next highest priority, otherwise the client device entering a low power state.

2. The client device of claim 1, wherein the local data includes at least one of a local file, a local application, local application state, or a combination thereof.

3. The client device of claim 1, wherein the prioritizing based on importance factors includes for each of the plurality of sets of local data a function of a local profile of a user of the computing device.

4. The client device of claim 1, wherein the prioritizing based on importance factors includes for each of the plurality of sets of local data a function of an elapsed time period of when each of the plurality of sets of local data was last processed on the client device.

5. The client device of claim 1, wherein the prioritizing based on importance factors includes for each of the plurality of sets of local data a function of a topic extracted from each of the plurality of sets of local data.

6. The client device of claim 1, wherein the receiving a request for the client device to enter a low power state includes at least one of
    a battery power level,
    a user selection of a button on the client device to enter a low-power state, and
    detection that a cover of the client device is closed.

7. The client device of claim 1, further comprising:
    receiving at least one message from at least another client device to maintain access to at least one of the plurality of sets of local data on the client device, wherein the at least one message includes receiving at least one of a keep alive message, a heartbeat message, a text message, and an email or a combination thereof.

8. The client device of claim 1, wherein the copying the next set of local data to the server computer includes copying the next set of local data to the server computer running an emulator of an operating environment including an operating system of the client device.

9. The client device of claim 1, wherein the prioritizing based on importance factors includes for each of the plurality of sets of local data an available network bandwidth for the local data.

10. The client device of claim 1, wherein the prioritizing based on importance factors includes for each of the plurality of sets of local data a CPU required to suspend a process using the local data.

11. The client device of claim 1, wherein the prioritizing based on importance factors includes for each of the plurality of sets of local data memory required to suspend a process using the local data.

12. The client device of claim 1, wherein the prioritizing based on importance factors includes for each of the plurality of sets of local data a number of messages received which are associated with the local data.

13. The client device of claim 1, wherein the prioritizing based on importance factors includes for each of the plurality of sets of local data a last accessed time of the local data.

14. The client device of claim 1, wherein the prioritizing based on importance factors includes for each of the plurality of sets of local data one or more
   a size of the local data,
   available network bandwidth for the local data,
   CPU required to suspend a process using the local data,
   memory required to suspend a process using the local data,
   a number of messages received which are associated with the local data, and
   a last accessed time of the local data.

15. A client device comprising:
   processing at least a first set of local data in a plurality of sets of local data on a first client device;
   processing at least a second set of local data on the first client device;
   associating a relative importance value to each of the first set of local data and the second set of local data
   receiving at least one message from at least a second client device to maintain access to the first set of local data on the first client device;
   receiving a request for the first client device to enter a low power state;
   calculating a local power requirement on the first client device in order to transfer a copy of the first set of local data to a server computer in order to continue to provide access to the first set of local data, wherein the calculating the local power requirement includes calculating on the local power required to separately transfer a copy of at least one of the first set of local data, and the second set of local data to the server computer;
   based on the local power requirement exceeding a required threshold and the message requesting access, copying the first set of local data to the server computer; and
   after a transfer of the local data to the server computer is complete, the first client device entering a low power state; and
   assigning a priority order for separately transferring a copy of each of the first set of local data and the second set of local data based on a function of
      the local power requirement, and
      the relative importance value;
   wherein based on the local power requirement exceeding the required threshold for the first set of local data and the priority order assigned to the first set of local data being higher than the priority assigned to the second set of local data, copying the first set of local data to the server computer, and after a transfer of the first set of local data and based on the local power requirement exceeding a required threshold for the second set of local data, copying the first set of local data to the server computer;
   wherein based on the local power requirement exceeding a required threshold for the second set of local data and the priority order assigned to the second set of local data being higher than the priority assigned to the first set of local data, copying the second set of local data to the server computer, and after a transfer of the second set of local data and based on the local power requirement exceeding a required threshold for the first set of local data, copying the first set of local data to the server computer.

16. The client device of claim 15, wherein the assigning a priority order for transferring a copy of each of the first set of local data and the second set of local data is further based on a function of available bandwidth to separately transferring a copy of each of the first set of local data and the second set of local data to the server computer.

* * * * *